(12) United States Patent
May

(10) Patent No.: US 7,605,595 B2
(45) Date of Patent: Oct. 20, 2009

(54) SYSTEM FOR CLEARANCE MEASUREMENT AND METHOD OF OPERATING THE SAME

(75) Inventor: Andrzej May, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/540,745

(22) Filed: Sep. 29, 2006

(65) Prior Publication Data

US 2008/0079445 A1    Apr. 3, 2008

(51) Int. Cl.
G01R 27/08    (2006.01)
G01R 27/26    (2006.01)

(52) U.S. Cl. ...................... 324/716; 324/662
(58) Field of Classification Search ............... 324/716, 324/715, 713, 691, 649, 600, 696, 690, 437, 324/445, 446, 447, 635, 644, 661, 662, 671, 324/672, 699
See application file for complete search history.

(56) References Cited

U.S. PATENT DOCUMENTS

| | | | | |
|---|---|---|---|---|
| 3,480,963 | A * | 11/1969 | Stowell | 347/117 |
| 3,711,767 | A * | 1/1973 | Campbell et al. | 324/538 |
| 4,058,765 | A * | 11/1977 | Richardson et al. | 324/669 |
| 4,567,435 | A * | 1/1986 | Yamada et al. | 324/207.12 |
| 4,764,906 | A | 8/1988 | Clements et al. | |
| 4,806,848 | A | 2/1989 | Demers | |
| 4,845,991 | A | 7/1989 | Presbie | |
| 5,085,499 | A * | 2/1992 | Griffin et al. | 356/311 |
| 5,365,147 | A * | 11/1994 | Shinohara et al. | 315/111.21 |
| 5,382,911 | A * | 1/1995 | Cotler et al. | 324/662 |
| 5,448,173 | A * | 9/1995 | Shinohara et al. | 324/464 |
| 5,701,082 | A * | 12/1997 | Rogers | 324/628 |
| 5,723,980 | A | 3/1998 | Haase et al. | |
| 5,734,268 | A * | 3/1998 | Bockelman | 324/601 |
| 5,770,922 | A * | 6/1998 | Gerrish et al. | 315/111.21 |
| 5,800,618 | A | 9/1998 | Niori et al. | |
| 6,150,826 | A * | 11/2000 | Hokodate et al. | 324/662 |
| 6,509,744 | B1 | 1/2003 | Biermann et al. | |
| 6,998,832 | B1 * | 2/2006 | McNulty | 324/72.5 |

(Continued)

FOREIGN PATENT DOCUMENTS

DE    19847365    5/2000

(Continued)

OTHER PUBLICATIONS

M. Shah et al., "Displacement Sensor System and Method of Operation," U.S. Appl. No. 11/115,736, filed Aug. 28, 2004.

(Continued)

*Primary Examiner*—Hoai-An D Nguyen
(74) *Attorney, Agent, or Firm*—Patrick K. Patnode

(57) ABSTRACT

A clearance sensing system is disclosed. The system includes a probe separated from a test object by a variable distance d. The system also includes an alternating current (AC) source for supplying a current through the probe, wherein the AC source and the probe are configured to generate a controlled plasma channel between a tip of the probe and the test object. The system further includes a processing unit configured to determine the variable distance d based on a voltage difference between the tip of the probe and the test object.

18 Claims, 7 Drawing Sheets

U.S. PATENT DOCUMENTS

| | | | |
|---|---|---|---|
| 7,015,414 B2 * | 3/2006 | Mitrovic | 219/121.43 |
| 7,015,703 B2 * | 3/2006 | Hopkins et al. | 324/655 |
| 7,205,700 B2 | 4/2007 | Yamato | |
| 7,251,195 B1 | 7/2007 | Reiff et al. | |
| 7,275,013 B1 * | 9/2007 | Matlis et al. | 702/144 |
| 7,281,491 B2 | 10/2007 | Iwamaru | |
| 2005/0206018 A1 * | 9/2005 | Ohmi et al. | 257/E21.525 |
| 2006/0049138 A1 * | 3/2006 | Miyake et al. | 216/58 |
| 2006/0066318 A1 | 3/2006 | Andarawis et al. | |
| 2006/0082786 A1 * | 4/2006 | Kim et al. | 356/504 |
| 2006/0125492 A1 | 6/2006 | Andarawis et al. | |
| 2006/0132147 A1 | 6/2006 | Balasubramaniam et al. | |
| 2006/0139039 A1 * | 6/2006 | Dutton et al. | 324/754 |
| 2006/0239813 A1 * | 10/2006 | Shah et al. | 415/119 |
| 2007/0005294 A1 * | 1/2007 | Andarawis et al. | 702/155 |
| 2007/0262723 A1 * | 11/2007 | Ikenouchi | 315/111.21 |

FOREIGN PATENT DOCUMENTS

| | | |
|---|---|---|
| GB | 2317265 | 3/1998 |

OTHER PUBLICATIONS

E. Andarawis et al., "Clearance Measurement System and Method of Operation," U.S. Appl. No. 11/167,434, filed Jun. 27, 2005.

M. Barlow, "Modulated Plasma Audio Transducer Circuit Simplification with Power Bipolar Junction Transistors," Youngstown State University Department of Electrical and Computer Engineering, Jan. 28, 2006.

J. H. Cho et al., "Coplanar ac Discharges Between Cylindrical Electrodes With a Nanoporous Alumina Dielectric: Modular Dielectric Barrier Plasma Devices," IEEE Transactions Plasma Science, vol. 33, No. 2, Apr. 2005, pp. 378-379.

R. Rahul et al., "Optical and RF electric characteristics of atmospheric pressure open-air hollow slot microplasmas and application to bacterial inactivation," Journal of Physics D: Applied Physics, 38, 2005, pp. 1750-1759.

M. J. Colgan et.al., "Very High Frequency Capacitive Plasma Sources," in High Density Plasma Sources, O. Popov, Editor, Noyes Publications, Park Ridge, New Jersey, 1995, pp. 149-190.

J. Hopwood et al., "A microfabricated atmospheric-pressure microplasma source operating in air," Journal of Physics D: Applied Physics, 38, 2005, pp. 1698-1703.

A. May et al., "Radio-frequency plasma transducer for use in harsh environments," 33rd Annual Review of Progress in Quantitative Nondestructive Evaluation, Portland, OR, 2006, pp. 1-11.

J. J. Shi et al., "Three modes in a radio frequency atmospheric pressure glow discharge," Journal of Applied Physics, vol. 94, No. 10, Nov. 2003, pp. 6303-6310.

E. Marode, "The mechanism of spark breakdown in air at atmospheric pressure between a positive point and a plane," Journal of Applied Physics, vol. 46, No. 5, May 1975, pp. 2005-2015.

D. M. Pozar, "Microwave Engineering," John Wiley and Sons, 1998, pp. 56-72.

S. Dixon et al., "Generation of ultrasound by an expanding plasma," Journal of Physics D: Applied Physics, vol. 29, 1996, pp. 3039-3044.

M. J. DiToro, Low-dispersion wired delay lines,: 1958, IRE National Convention Record, New York, pp. 82-90.

EP Search Report, EP 07117162, Dec. 6, 2007.

DE19847365 Abstract, Apr. 4, 2000.

* cited by examiner

SYSTEM FOR CLEARANCE MEASUREMENT AND METHOD OF OPERATING THE SAME

BACKGROUND

The invention relates generally to probe and sensor systems, and more particularly to a probe for measuring a clearance between two objects.

Various types of probe and sensor systems have been used to measure the distance between two objects. In addition, the probe systems have been used in various applications. For example, a turbine has a number of turbine blades that are disposed adjacent to a shroud. The clearance between a turbine blade and the shroud varies depending on the temperature of the turbine blade. For example, the clearance between the shroud and the turbine blade is greatest when the turbine is cold and gradually decreases as the turbine heats up. It is desirable that a gap or clearance between the turbine blade and the shroud be maintained for safe and effective operation of the turbine. A sensor may be disposed within the turbine to measure the distance between the turbine blades and the shroud. The distance may be used to direct movement of the shroud to maintain the desired displacement between the shroud and the turbine blades.

Efficiency of rotating components such as turbines and compressors are also strongly affected by a gap or clearance between a rotating blade and a component casing. In general, minimizing the gap maximizes the efficiency of the components. However, a small amount of clearance is desirable to prevent the rotating blade from hitting the component casing. In certain applications, a capacitance probe is employed to measure the distance between two objects. The probe is located on one of the objects and measures a capacitance with respect to the other object for estimating the clearance between the two objects. However, for high temperature applications, such as gas turbines, existing devices are expensive and difficult to manufacture, due to the strict requirements necessary for the devices to operate in harsh operating environments.

Therefore, there is a need for an improved sensor system to address the aforementioned issues.

BRIEF DESCRIPTION

In accordance with one embodiment of the present invention, a clearance sensing system is provided. The system includes a probe separated from a test object by a variable distance d. The system also includes an alternating current (AC) source for supplying a current through the probe, wherein the AC source and the probe are configured to generate a controlled plasma channel between a tip of the probe and the test object. The system further includes a processing unit configured to determine the variable distance d based on a voltage difference between the tip of the probe and the test object.

In accordance with another embodiment of the invention, a method of measuring a distance to an electrically conductive rotating object is disclosed. The method includes disposing a probe a variable distance d from the electrically conductive rotating object. The method further includes initiating and stabilizing a plasma discharge between a tip of the probe and the electrically conductive rotating object. The method further includes measuring at least one of a voltage drop, a current through a plasma formed between the tip of the probe and the electrically conductive rotating object, and an impedance of the probe. In addition, the method includes determining the distance to the electrically conductive rotating object based upon at least one of the voltage drop, the current and the impedance

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a clearance sensing system and a method of operating the same. As used herein, 'plasma discharge' refers to plasma generated at atmospheric pressure and at a radio frequency with a frequency greater than about 1 MHz.

Figure 1:
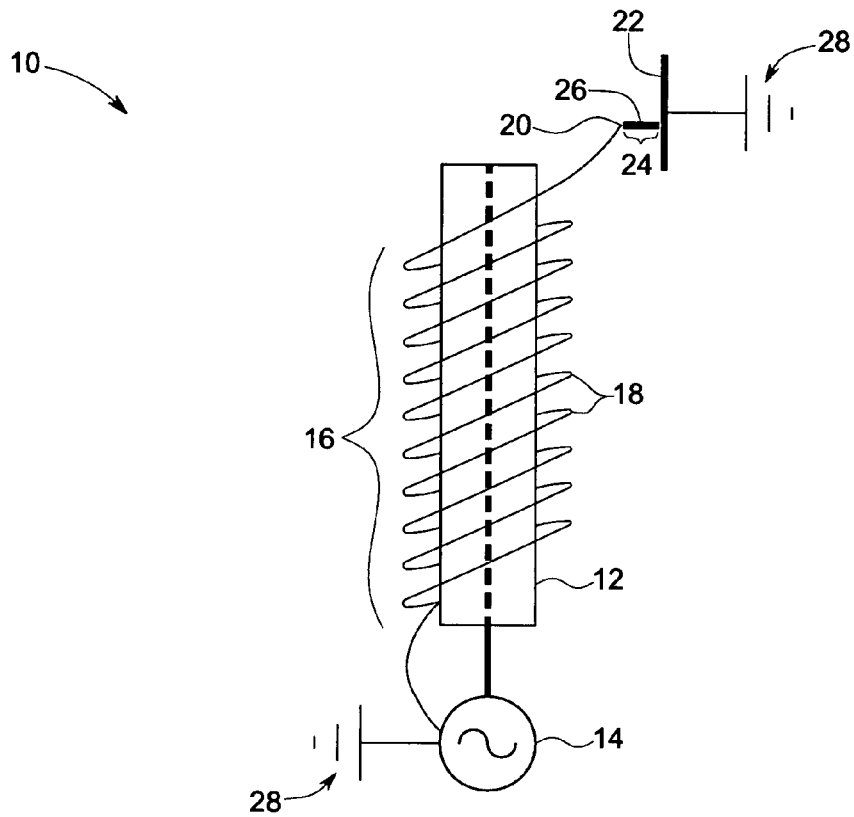
FIG. 1 is a diagrammatic illustration of a probe system for initiating and stabilizing plasma at radio frequency in accordance with embodiments of the invention.

Turning now to the drawings, FIG. 1 is a diagrammatic illustration of a system 10 for initiating and stabilizing plasma. The system 10 may also be referred to as a plasma probe 10. The plasma probe 10 includes an inner conductor 12 coupled to an alternating current (AC) voltage source 14. In the illustrated embodiment, an outer conductor 16 including multiple windings 18 is arranged around the inner conductor 12. The outer conductor 16 is coupled to the AC voltage source 14 at one end and forms a first electrode 20 at an opposite end. A second electrode 22 is separated from the first electrode 20 by a gap 24 for initiating a plasma discharge 26. In a particular embodiment, the inner conductor 12 includes a conductor cylindrical in shape. In another embodiment, the inner conductor 12 includes a wire. In an example, the outer conductor 16 is a solenoid. In an exemplary embodiment, the inner conductor 12 is grounded. In another embodiment, the outer conductor 16 is grounded through the AC voltage source 14. In an example, the plasma discharge 26 initiates an atmospheric pressure radio-frequency plasma with a frequency in a range between about 6 MHz and about 7.5 MHz. In a particular embodiment, the inner conductor 12 and the outer conductor 16 are configured to step up a voltage supplied by the AC voltage source 14 to initiate the plasma 26 by at least about 20 dB.

Figure 2:
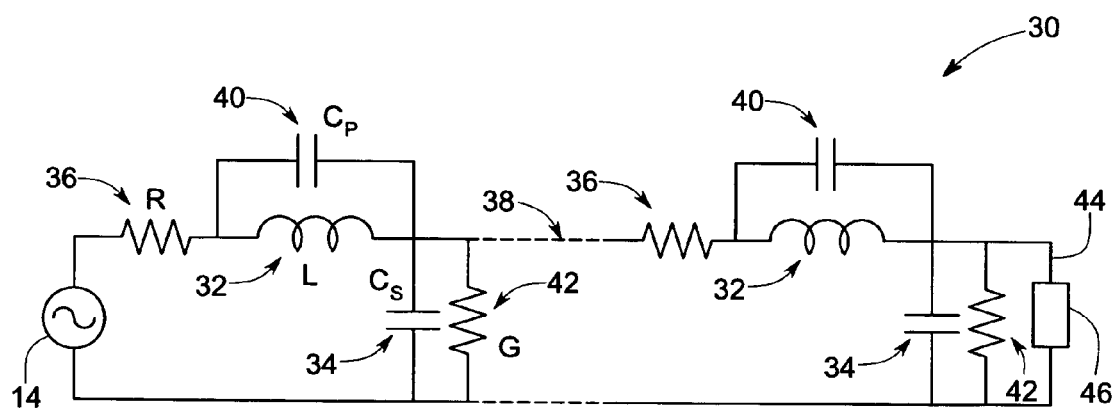
FIG. 2 is an equivalent circuit representing the probe system in FIG. 1.

FIG. 2 is an equivalent circuit 30 of the plasma probe 10 in FIG. 1. For the illustrated embodiment, the inner conductor 12 as referenced in FIG. 1 and the outer conductor 16 as referenced in FIG. 1 are configured as a series LC circuit, wherein L is the inductance of the outer conductor 16 represented by inductor 32 and $C_s$ is the capacitance between the inner conductor 12 and the outer conductor 16 represented by capacitor 34. The inductor 32 may have a small real value resistance represented by resistor 36. In a particular embodiment, the resistance 36 may vary between about 10 and about 100 ohms. The plasma probe 10 as referenced in FIG. 1 acts as a quarter wave transformer with a distributed transmission line 38 through the inner conductor 12 and the outer conductor 16. The outer conductor 16 may include a large number of windings 18 as referenced in FIG. 1 so as to increase the inductance per unit length. The windings 18 may include a parasitic capacitance 40 between each of the windings 18 and is much smaller than the capacitance 34 denoted by $C_s$. Consequently, the capacitance 40 may be negligible. The electrical circuit 30 may also include a leakage resistance 42 of the capacitance 34 and is denoted by G. The leakage resistance 42 may be very small and hence negligible.

Prior to the plasma being initiated, the AC voltage source 14 sees an open circuit transmission line as there is no load. The equivalent circuit 30 is resonated at a quarter wavelength. Quarter wave resonance occurs when frequency of the source generates a standing wave in the transmission line 38 such that the physical length of the transmission line 38 is a quarter of the wavelength of the standing wave. Thus, the source 14 sees a short circuit at an end 44 of the transmission line 38 resulting in a load 46. This leads to a large amount of current being driven into the transmission line 38. The large current generated passes through the inductor 32 and the capacitor 34. Further, impedance of the inductor 32, which is given by $2\pi fL$ wherein f is the frequency of the source 14, is large as both L and f are large. Hence, voltage drop across the inductor 32 is large resulting in a high voltage at the end 44 of the transmission line 38. The high voltage initiates generation of plasma at the load 46.

The generation of plasma leads to the transmission line 38 being short circuited at the load 46. In such a scenario, the current driven into the transmission line 38 may have two paths. One of them being through the inductor 32 as described above and the other being through the load 46 bypassing the inductor 32. Thus, the current gets split into two paths with lesser amount of current flowing through the inductor 32. This results in a lower voltage drop across the inductor 32 that is also the voltage through the generated plasma at the load 46. Hence, the current going into the plasma is reduced consequently increasing the plasma resistance. A very fast negative feedback loop is generated thus stabilizing the generated plasma at load 46. Thus, the plasma probe 10 plays an important role in initiating the plasma and then stabilizing the voltage to a desirable value so as not to extinguish the plasma and at the same time preventing any possible burn out.

Figure 3:
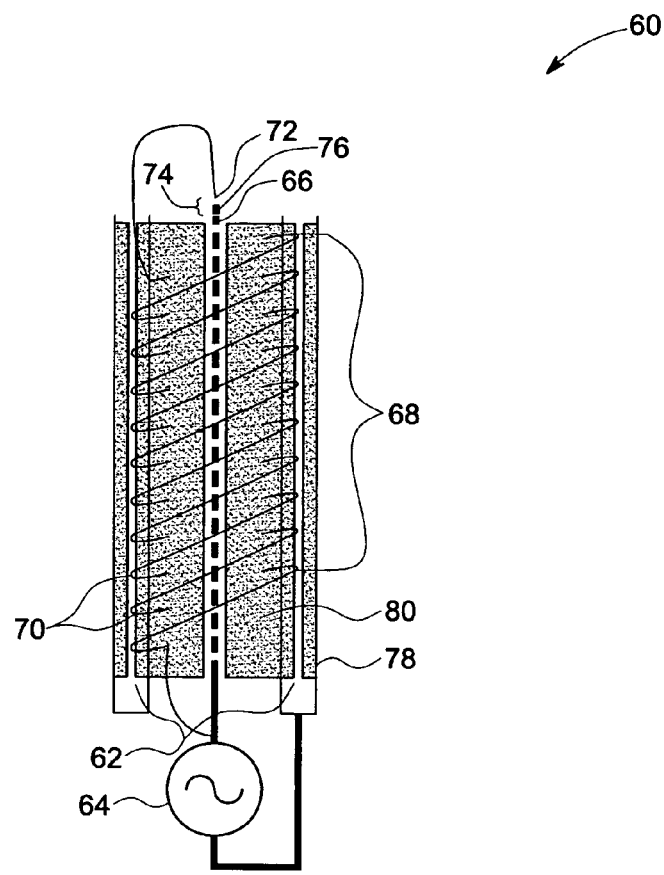
FIG. 3 is a diagrammatic illustration of a shielded probe system for initiating and stabilizing plasma at radio frequency in accordance with embodiments of the invention.

In another illustrated embodiment of the invention, FIG. 3 depicts a shielded probe system 60 to initiate and stabilize plasma generation. The system 60 includes a center conductor 62 coupled at one end to an AC voltage source 64 and forming a first electrode 66 at an opposite end. The system 60 also includes an outer conductor 68 including multiple windings 70 arranged around the center conductor 62. For the illustrated embodiment, the outer conductor 68 is coupled at one end to the AC voltage source 64 and form a second electrode 72 at an opposite end. The first electrode 66 and the second electrode 72 are separated by a gap 74 to initiate a plasma discharge 76. The shielded probe system 60 may initiate a higher temperature plasma discharge than the unshielded probe. warm plasma discharge. The system 60 further includes a shield 78 disposed concentric with the center conductor 62 for electromagnetic interference shielding. The magnetic field generated by the outer conductor 68 is compressed and exists in the space between the center conductor 62 and the shield 78. The center conductor 62 and the outer conductor 68 may be configured to step-up a voltage of the AC voltage source 64 by about 30 dB. Insulation 80 may be disposed between the center conductor 62 and the shield 78. In a particular embodiment, the insulation 80 may include a ceramic insulation. In an example, the shield 78 may include an inner conductive cylinder and an outer conductive cylinder that are concentric and connected to one another, and wherein the outer conductor 68 may be disposed between the inner and outer conductive cylinders.

Figure 4:
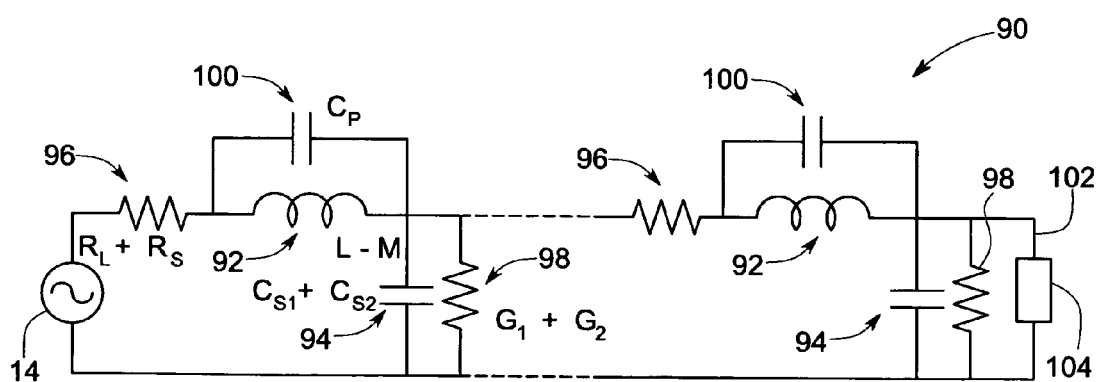
FIG. 4 is an equivalent circuit representing the shielded probe system in FIG. 3.

FIG. 4 is an equivalent circuit 90 of the shielded probe system 60 in FIG. 3. For the illustrated embodiment, the center conductor 62 in FIG. 3 and the outer conductor 68 in FIG. 3 are configured as a series LC circuit. The presence of the shield 78 as referenced in FIG. 3 reduces the effective inductance in the circuit 90 and increases the effective capacitance. The effective inductance is equivalent to (L−M) represented by inductor 92, wherein L is the inductance of the center conductor and M is the mutual inductance between the center conductor 62 and the shield 78 due to eddy current losses. The effective capacitance is equivalent to $(C_{s1}+C_{s2})$ represented by capacitor 94, wherein $C_{s1}$ is the capacitance between the center conductor 62 and the outer conductor 68 and $C_{s2}$ is the capacitance between the shield 78 and the outer conductor 68. The inductor 92 may have a small real value resistance represented by resistor 96 that includes resistance due to eddy current losses. The capacitor 94 may include a negligible leakage resistance represented by a leakage resistor 98. The circuit 90 may also include a negligible parasitic capacitance represented by capacitor 100 between each of the windings 70 as referenced in FIG. 3. Since the effective inductance is smaller and there are more losses in the form of eddy currents, the voltage required to initiate a plasma discharge increases. The initiation of a plasma discharge results in a short circuit at an end 102 with a load 104. Hence, this may lead to a lesser efficient plasma probe as compared to the plasma probe described in FIG. 1.

Figure 5:
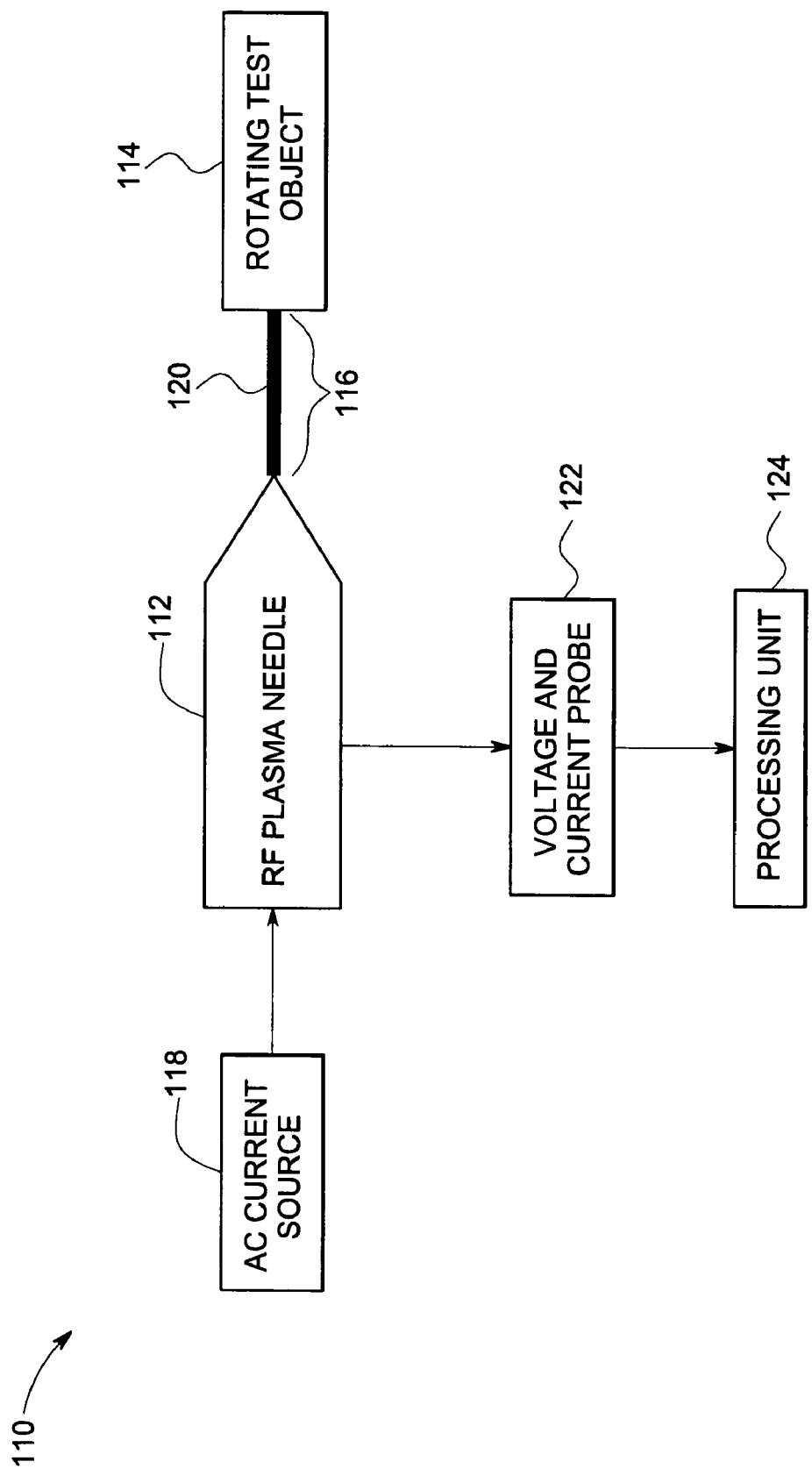
FIG. 5 is a block diagram representation of a clearance sensing system in accordance with embodiments of the invention.

FIG. 5 is a block diagram representation of a clearance sensing system 110. The system 110 includes a probe 112 separated from a test object 114 by a variable distance 116 denoted by 'd'. In particular embodiments, the test object 114 is an electrically conductive rotating test object 114. In a particular embodiment, the probe 112 may include a wire made of a material selected from the group consisting of tungsten, iron, nickel and aluminum. In another embodiment, the probe 112 may be a radio frequency (RF) plasma probe. For example, the RF plasma probe may have an operational frequency in a range between about 6 MHz to about 7.5 MHz. In a particular embodiment, the RF plasma probe is an unshielded plasma probe as described in FIG. 1. In another embodiment, the RF plasma probe is a shielded plasma probe, for example as described in FIG. 3. An alternating (AC) current source 118 is provided for supplying a current to the probe 112. For particular embodiments, the AC source 118 supplies a constant magnitude current to the probe 112. A controlled plasma channel 120 may be generated between a tip of the probe 112 and the test object 114. The impedance of the plasma channel is primarily resistive and can vary in a range of about one kiliohm and 500 kiliohms depending upon the current flowing through the plasma channel, the channel length and the properties of the gas in the channel (gas constituents, pressure and temperature, for example). In certain embodiments, the plasma is stabilized using a constant current, high frequency (at least about 20 kHz) source 118. A voltage and current probe 122 may be used to measure a voltage difference between the tip of the probe 112 and the rotating test object 114. The system 110 also includes a processing unit 124 configured to determine the variable distance 'd' 116 based on the voltage difference measured between the tip of the probe 112 and the rotating test object 114. The voltage difference corresponds to a change in impedance of the probe 112. The change in impedance of the probe 112 is proportional to the distance 'd' 116. In a particular embodiment, the processing unit 124 is configured to compare the measured change in impedance with calibration data to determine 'd' 116. In an example, the rotating test object 114 may be part of a turbine or a compressor, for example a turbine blade. In another embodiment, the variable distance 'd' 116 may be in a range between about 1 μm to about 20 mm.

It should be noted that the present invention is not limited to any particular processing unit for performing the processing tasks of the invention. The term "processing unit," as that term is used herein, is intended to denote any machine capable of performing the calculations, or computations, necessary to perform the tasks of the invention. The term "processing unit" is intended to denote any machine that is capable of accepting a structured input and of processing the input in accordance with prescribed rules to produce an output. It should also be noted that the phrase "configured to" as used herein means that the processing unit is equipped with a combination of hardware and software for performing the tasks of the invention, as will be understood by those skilled in the art.

Figure 6:
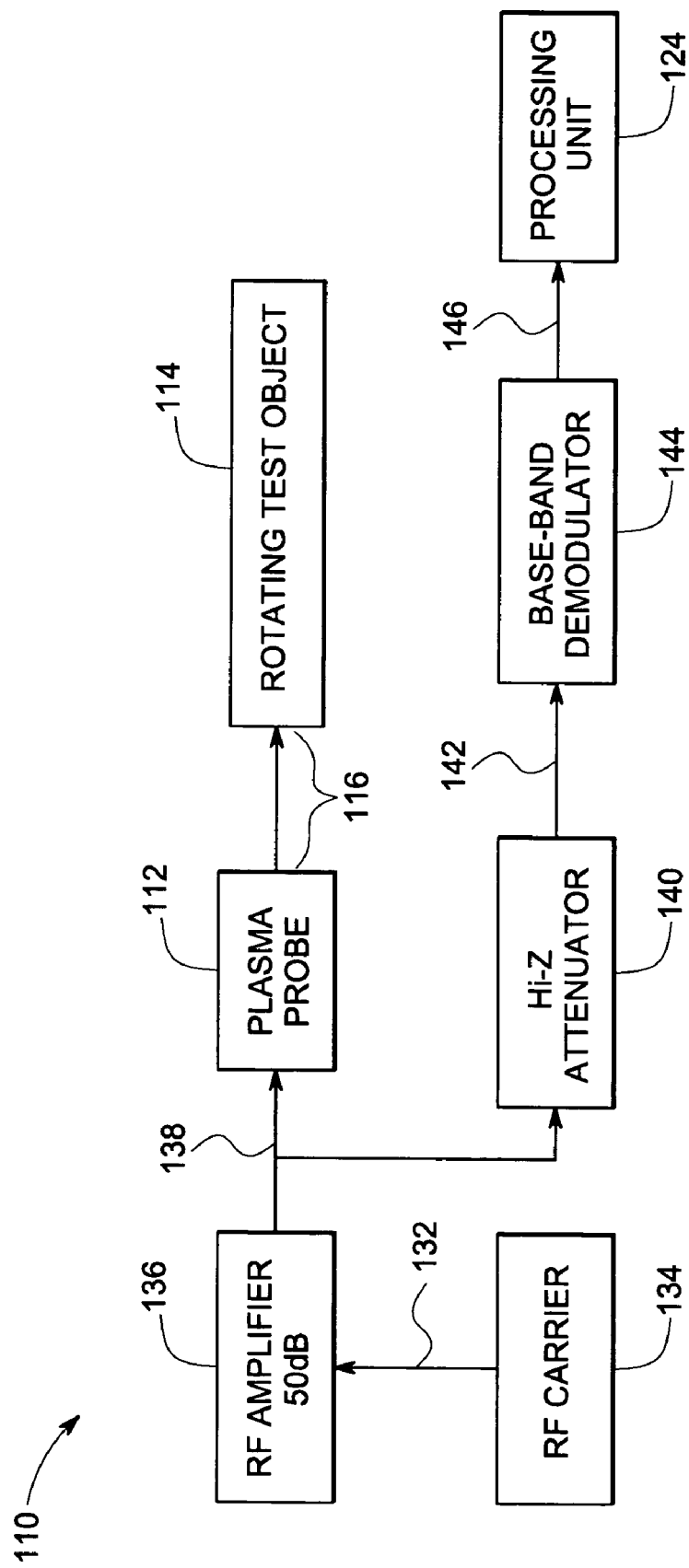
FIG. 6 is a block diagram representation of a particular example of the clearance sensing system in FIG. 5.

FIG. 6 is a block diagram representation of a particular example clearance sensing system 110. In the illustrated embodiment, the AC current source comprises a RF carrier source 134. A RF signal 132 from a RF carrier source 134 is fed into a RF amplifier 136 that amplifies the RF signal 132. In the illustrated example, the RD amplifier 136 amplifies the RF signal by 50 dB. The amplified RF carrier signal 138 is input to a RF plasma probe 112, as referenced in FIG. 5, to generate and sustain plasma in a gap 116 between the RF plasma probe 112 and the rotating test object 114, as referenced in FIG. 5. As noted above, the impedance of the plasma channel is primarily resistive and can vary in a range of about one kiliohm and 500 kiliohms depending upon the current flowing through the plasma channel, the channel length and the properties of the gas in the channel. Once the plasma is initiated, the impedance of the load increases. In an example, the impedance may increase from about 50 ohms to about 3 kiliohms. The amplified carrier signal 138 from the RF amplifier 136 is fed into an attenuator 140 to reduce the voltage of the amplified RF carrier signal 138 to an attenuated signal level 142 and also to measure voltage without changing the impedance of the generated plasma. In the illustrated embodiment, the attenuator 140 is a high impedance attenuator having an impedance, for example, of about 10 kohm to about 100 kohm. The attenuated signal 142 is then input into a demodulator 144 that separates an envelope signal 146 from the attenuated signal 142. There are multiple electromagnetic interference signals from various sources at a carrier frequency such as about 7 MHz. In order to avoid the interference signals, the envelope signal 146 is separated out. The envelope signal 146 is further fed into the processing unit 124 as referenced in FIG. 5 to monitor change in voltage of the envelope signal 146.

Figure 7:
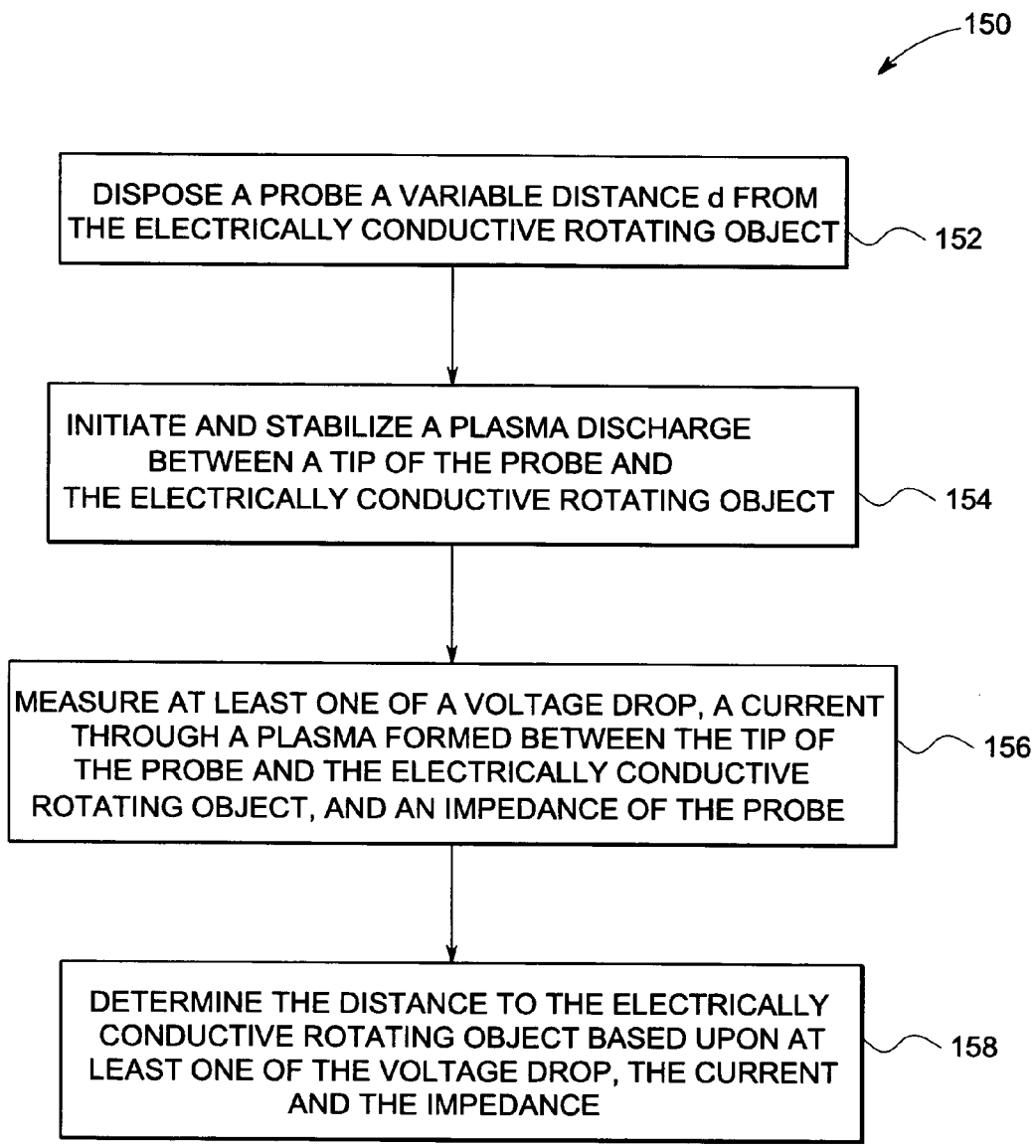
FIG. 7 is a flow chart illustrating exemplary steps for a method of measuring a clearance for a rotating object.

FIG. 7 is a flow chart illustrating exemplary steps for a method 150 of measuring a distance to an electrically conductive rotating object. The method 150 includes disposing a probe at a variable distance d from the electrically conductive rotating object in step 152. A plasma discharge between a tip of the probe and the electrically conductive rotating object is initialized and stabilized in step 154. In a particular embodiment, the plasma discharge is stabilized by supplying feedback in the probe in order to reduce current through the plasma. A voltage drop is measured through the plasma between the tip of the probe and the rotating object is measured in step 156. In another embodiment, current is measured through the plasma in step 156. In yet another embodiment, an impedance is further determined from the measured voltage drop and the current in step 156. In general, the complex impedance is equal to the ratio of the measured voltage drop to the constant magnitude current. In yet another embodiment, the impedance of the plasma probe is measured. Clearance for the rotating object is determined from at least one of the measured voltage, current and magnitude of the complex impedance in step 158. The determination of the clearance includes comparing the complex impedance with calibration data.

EXAMPLES

The examples that follow are merely illustrative and should not be construed to limit the scope of the claimed invention.

Figure 8:
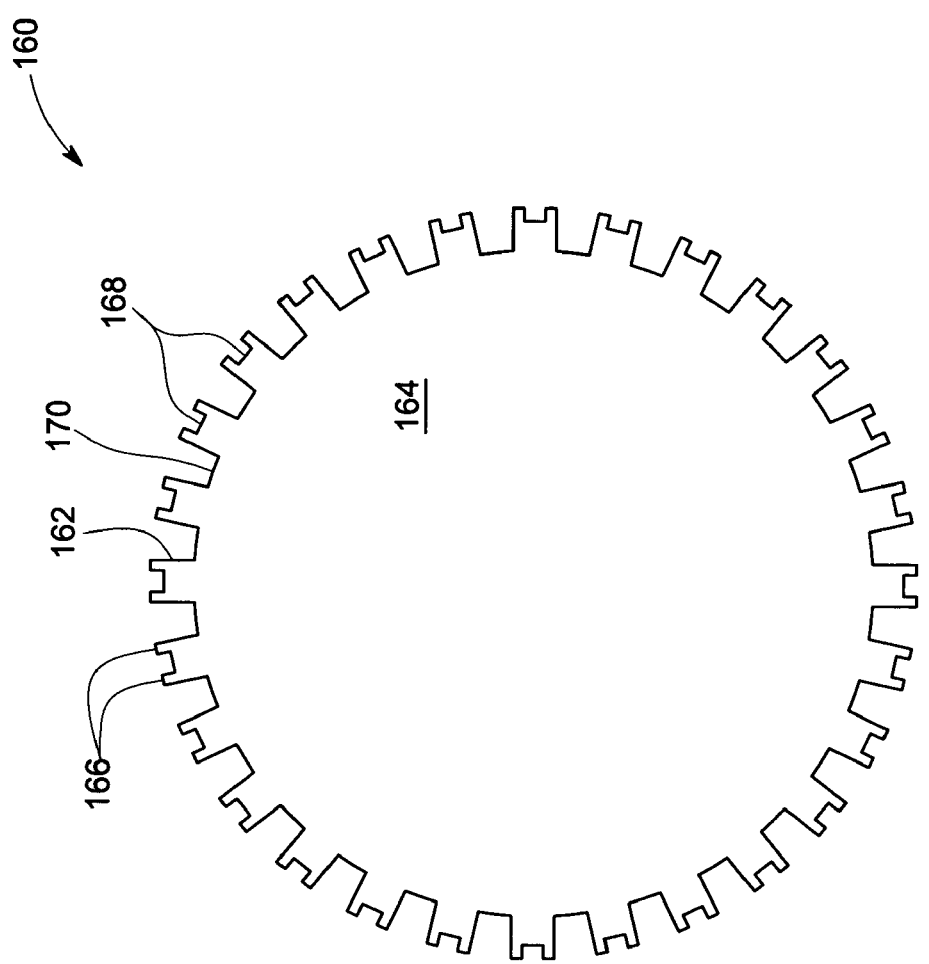
FIG. 8 is a diagrammatic illustration of a portion of a test rig.

FIG. 8 is a diagrammatic illustration of a portion of a test rig 160. The test rig 160 includes protrusions 162 that may represent turbine blades, for example, and a central portion 164. An optimum distance of clearance between the protrusions 162 and a casing or a shroud (not shown) is to be determined. Further, each of the protrusions 162 includes an edge 166 and a center plateau 168. A bottom plateau 170 denotes an edge of the central portion 164.

Figure 9:
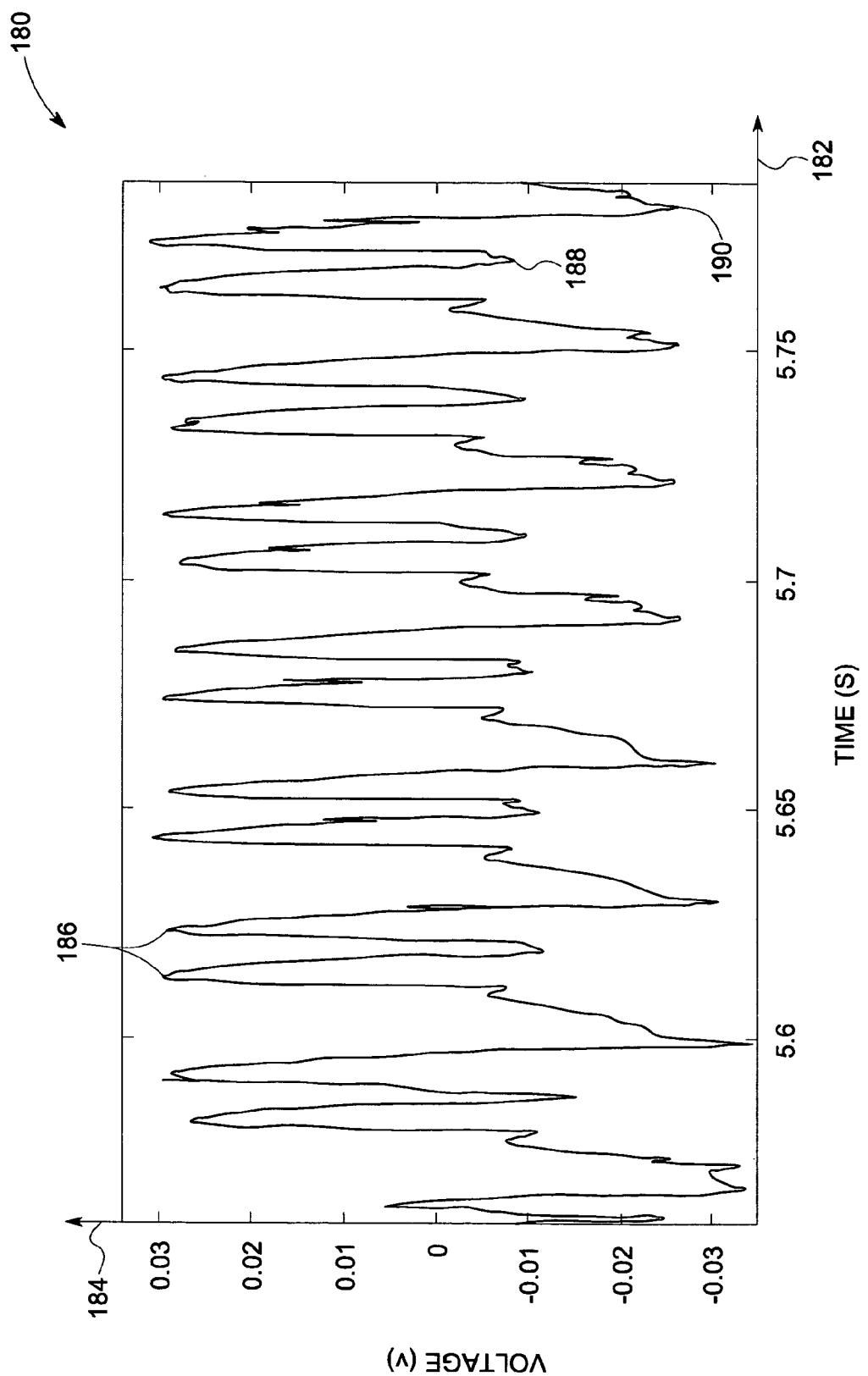
FIG. 9 is a graphical illustration of a voltage drop measured between a tip of the probe systems in FIG. 1 and FIG. 3 and a protrusion as in FIG. 8.

FIG. 9 is a graphical illustration 180 of the voltage difference measured between a tip of the RF plasma probe 112 as referenced in FIG. 5 and various parts of the rotating test rig 160 in FIG. 8 as a function of time. Rotation speed of a tip of the test rig 160 was set to about 0.4 m/sec. The X-axis 182 represents the elapsed time in seconds, and the Y-axis 184 represents the voltage of the envelope signal 144 as referenced in FIG. 6 as various parts of the rotating test rig pass the plasma discharge. A peak 186 indicates voltage measured at the edge 166 as referenced in FIG. 7 of the turbine blade 162. Similarly, point 188 indicates voltage measured at the center plateau 168 as referenced in FIG. 8 of the protrusion 162 and point 190 indicates voltage measured at the bottom plateau 170 as referenced in FIG. 8 between the protrusions 162. Distance between the edge 166 of the protrusion 162 and the center plateau 168 was about 1.3 mm. Similarly, distance between the edge 166 and the bottom plateau 170 was about 5 mm. As shown, a voltage difference of about 0.04 V was measured between the edge 166 and the center plateau 168, while a voltage difference of about 0.055 V was measured between the edge 166 and the bottom plateau 170.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A clearance sensing system comprising:
a probe separated from a test object by a variable distance d;
an alternating current (AC) source for supplying a current through the probe, wherein the AC source and the probe are configured to generate and sustain a controlled plasma channel between a tip of the probe and the test object; and a processing unit for measuring a voltage difference between the tip of the probe and the test object and computing the variable distance d from the voltage difference.

2. The clearance system of claim 1, wherein the probe comprises a wire.

3. The clearance system of claim 2, wherein the wire comprises a material selected from the group consisting of tungsten, iron, nickel and aluminum.

4. The clearance sensing system of claim 1, wherein the probe comprises a radio frequency plasma probe.

5. The clearance sensing system of claim 4, wherein the radio frequency plasma probe has an operational frequency greater than about 1 MHz.

6. The clearance sensing system of claim 4, further comprising a radio frequency (RF) amplifier configured to receive a RF signal from the AC source and to supply an amplified RF signal to the radio frequency plasma probe.

7. The clearance sensing system of claim 1, wherein the test object comprises a rotating test object.

8. The clearance sensing system of claim 7, wherein the rotating test object comprises a turbine blade.

9. The clearance sensing system of claim 1, further comprising an attenuator configured to attenuate a voltage signal received from the probe to supply an attenuated voltage signal.

10. The clearance sensing system of claim 9, further comprising a baseband demodulator configured to demodulate the attenuated voltage signal.

11. The clearance sensing system of claim 1, wherein the variable distance d varies in a range between about 1 μm to about 20 mm.

12. The clearance sensing system of claim 1, wherein the processing unit is further configured to determine an impedance for the controlled plasma channel and to compare the impedance with a plurality of calibration data to determine the variable distance d.

13. The clearance sensing system of claim 1, wherein the current supplied by the AC source is a constant magnitude current.

14. The clearance sensing system of claim 7, further comprising a voltage and current probe configured to measure the voltage difference between the tip of the probe and the rotating test object.

15. A method for measuring a distance to an electrically conductive rotating object, the method comprising:

disposing a probe a variable distance d from the electrically conductive rotating object;

initiating and stabilizing a plasma discharge between a tip of the probe and the electrically conductive rotating object;

measuring at least one of a voltage drop between the tip of the probe and the test object, a current through a plasma formed between the tip of the probe and the electrically conductive rotating object, and an impedance of the probe; and computing the variable distance d to the electrically conductive rotating object based upon at least one of the voltage drop between the tip of the probe and the test object, the current and the impedance.

16. The method of claim 15, wherein the initiating and stabilizing comprises maintaining a constant magnitude current through the probe.

17. The method of claim 15, wherein determining the distance to the electrically conductive rotating object comprises comparing the impedance with a plurality of calibration data.

18. The method of claim 15, further comprising supplying feedback in the probe to stabilize the plasma discharge.

* * * * *